Figure 1:
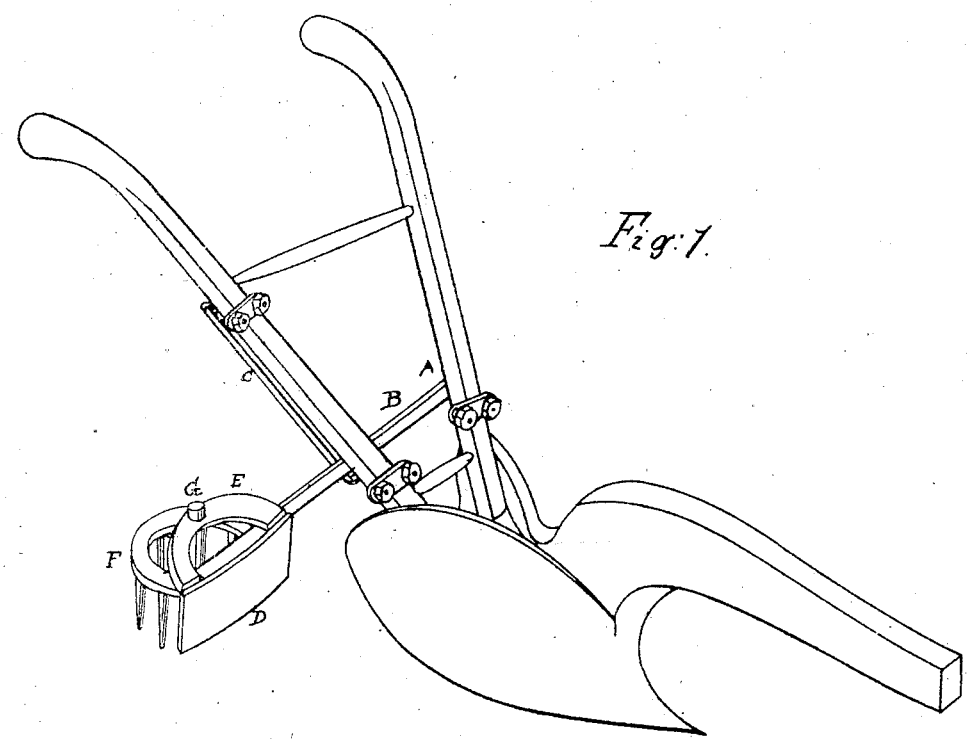
Figure 2:
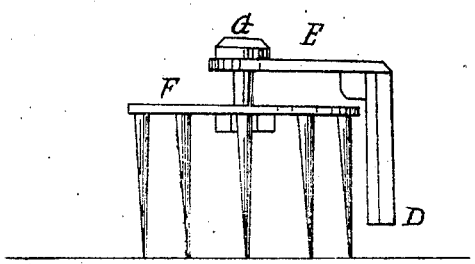
Figure 3:
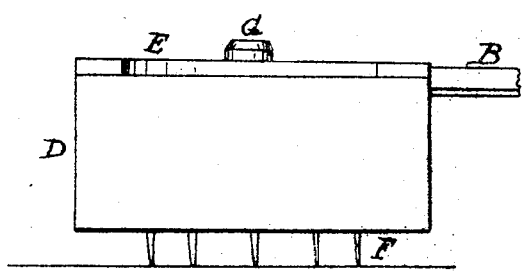

P. Wonsey.
Plow & Harrow.

No. 74024. Patented Feb. 4, 1868.

Witnesses
S. M. Woods.
W. T. West.

Inventor
P. Wonsey
per Edw. W. Wood
his atty.

United States Patent Office.

PHILANDER WONSEY, OF OGDEN, NEW YORK.

Letters Patent No. 74,024, dated February 4, 1868.

COMBINED PLOUGH AND HARROW.

*The Schedule referred to in these Letters Patent and making part of the same.*

---

PHILANDER WONSEY, of the town of Ogden, Monroe county, State of New York, having invented a new and useful Combination of Plough and Harrow, or of Plough, Harrow, and Scraper, which he believes has not been known or used prior to the invention thereof by himself, describes the same as follows, and refers to the accompanying drawing and specifications hereinafter given.

The harrow F is attached to the scraper D by a pivot, G, playing in a semicircular ring, E, attached at its extremities to the ends of the scraper in front. The scraper is a broad, flat sheet, of brass or iron, slightly rounded backward at the ends, to precede the harrow, and level the furrow as thrown up by the ploughshare. Attached to the scraper is an iron rod, B, running under the right shaft of the plough, and connected to the left shaft by a pivot, A, allowing it free play. Beneath the right shaft the rod is confined by a slot, C, running up the shaft a sufficient distance to allow the harrow and scraper to pass over a rock or high furrow, which slot is attached to the shaft by screws, or other means, allowing room for free motion of the rod along the shaft. To the rod is attached a screw, not shown in the drawings, which, when tightened about the slot, holds the rod and harrow firmly in position, increasing the effectiveness of the scraper and harrow, rendering a light harrow more efficient than a very heavy one, uncontrolled by the screw. In this way the draught is much lessened.

The scraper and harrow may be attached, if preferred, to the whiffle-trees, by moving them to the right so as to make the draught equal, or, by means of rods or chains, to any part of the ploughshare or beam.

What he claims as new, and wishes to secure by Letters Patent, is—

The combination of the harrow, scraper, and plough, and the manner in which they are attached and detached.

P. WONSEY.

Witnesses:
JOHN S. BROWN,
WM. CULL.